Dec. 8, 1964   K. DÜRHOLT   3,159,856
APPARATUS FOR SIMULTANEOUSLY THREAD ROLLING THE SHANK
AND CUTTING THREADS ON THE POINT OF A SCREW BLANK
Filed Dec. 31, 1962   2 Sheets-Sheet 1

Inventor:
Karl Dürholt
By
Watson, Cole, Grindle & Watson
Attys.

Dec. 8, 1964 K. DÜRHOLT 3,159,856
APPARATUS FOR SIMULTANEOUSLY THREAD ROLLING THE SHANK
AND CUTTING THREADS ON THE POINT OF A SCREW BLANK
Filed Dec. 31, 1962 2 Sheets-Sheet 2
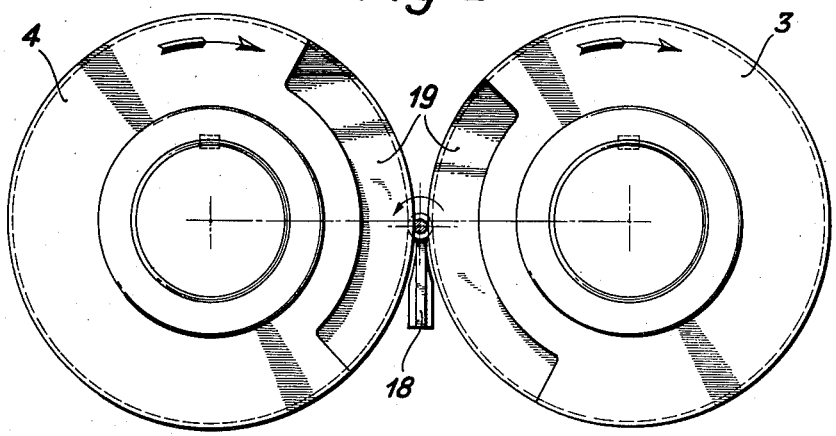
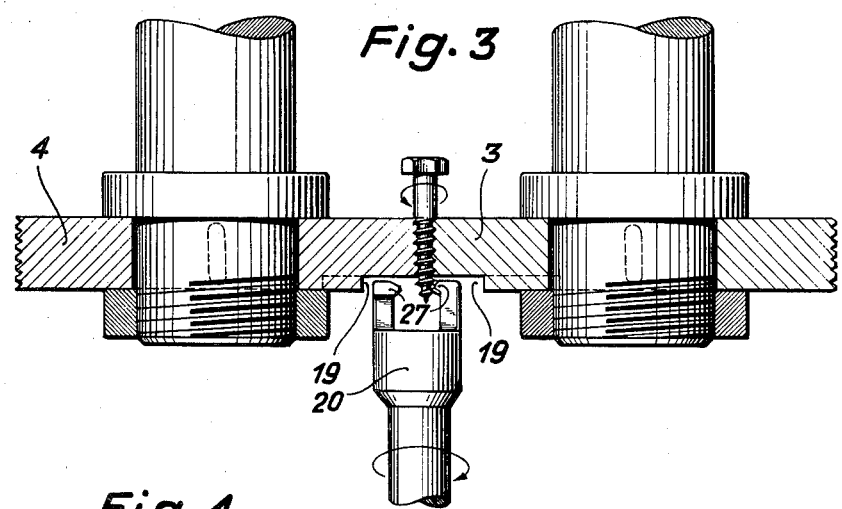
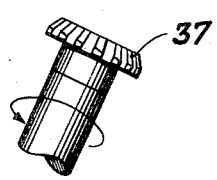
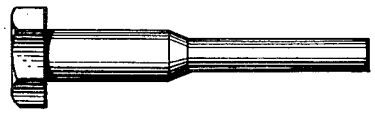
Inventor:
Karl Dürholt
By Watson, Cole, Grindle & Watson
Attys.

United States Patent Office 3,159,856
Patented Dec. 8, 1964

3,159,856
APPARATUS FOR SIMULTANEOUSLY THREAD ROLLING THE SHANK AND CUTTING THREADS ON THE POINT OF A SCREW BLANK
Karl Dürholt, Gevelsberg, Westphalia, Germany, assignor to Fa. Altenloh, Brinck & Co., Ennepetal-Milspe, Germany
Filed Dec. 31, 1962, Ser. No. 248,623
Claims priority, application Germany, Dec. 30, 1961, A 39,139
2 Claims. (Cl. 10—2)

The invention relates to apparatus for manufacturing wood screws from prefabricated blanks with reduced diameter of the threaded shank section.

Hitherto wood screws have been manufactured either by machining or by deformation or manipulation of the material. The advantage of the former method of producing perfect threads is balanced by the considerable disadvantages of comparatively long manufacturing periods, large material losses and high tool waste. Insofar as the second method has been practically used, the screw blanks, reduced over the threaded portion were fitted between two threaded jaws along which the blank rolled. However, this method is unsuitable for manufacturing the conical threaded points in the required quality, because the threads are not sharply formed but squeezed. This is due to the differential rolling speeds between the cylindrical shank portion and the point. In addition, the tools are very expensive.

It has, therefore, already been proposed to manufacture the cylindrical threaded shank and the threaded point separately on differentt special machines, but this requires again twice the quantity of machines and becomes uneconomical, due to the idle machine at times.

The invention has the object of combining the advantages of both manufacturing processes of a perfect thread and low material costs, without incurring their drawbacks, and consists in applying to the threaded shank in a first stage two approaching threaded rollers, driven in the same direction, for rolling the cylindrical portion of the shank, and in a second stage a separate tool for cutting the conical threaded point. An apparatus for carrying out this method comprises, as known to the art, two rotationally driven threaded rollers, one of which is stationary and the other carrying out movements in the step of an approach towards, or removal from, the stationary roller, and is characterized in that the thread rollers have on their end faces facing the shank ends recesses of such arcuate length, width, and depth that during every revolution of the thread rollers about the shank end of the blank, this shank end is open to access for a sufficient time to allow tools applied axially, or in a combined axial and radial movement, to cut the threaded point.

The method and apparatus according to the invention have the advantage that not only the threaded portion of the cylindrical shank, but also the point, are perfect and without transition and the threading is effected in one machine so that standstill times and transportation are avoided.

The manufacturing method according to the invention will be further explained with reference to a diagrammatical drawing, showing the apparatus for carrying out the method. In this drawing:

FIG. 2 shows the thread rollers of FIG. 1 in front elevation;

FIG. 3 is a cross sectional view of the threaded rollers of FIG. 2 showing the tool for cutting the threaded point;

FIG. 4 is a side view showing another embodiment of the threading tool; and

FIG. 5 is a side view showing, by way of example, a wood screw blank.

Figure 1:
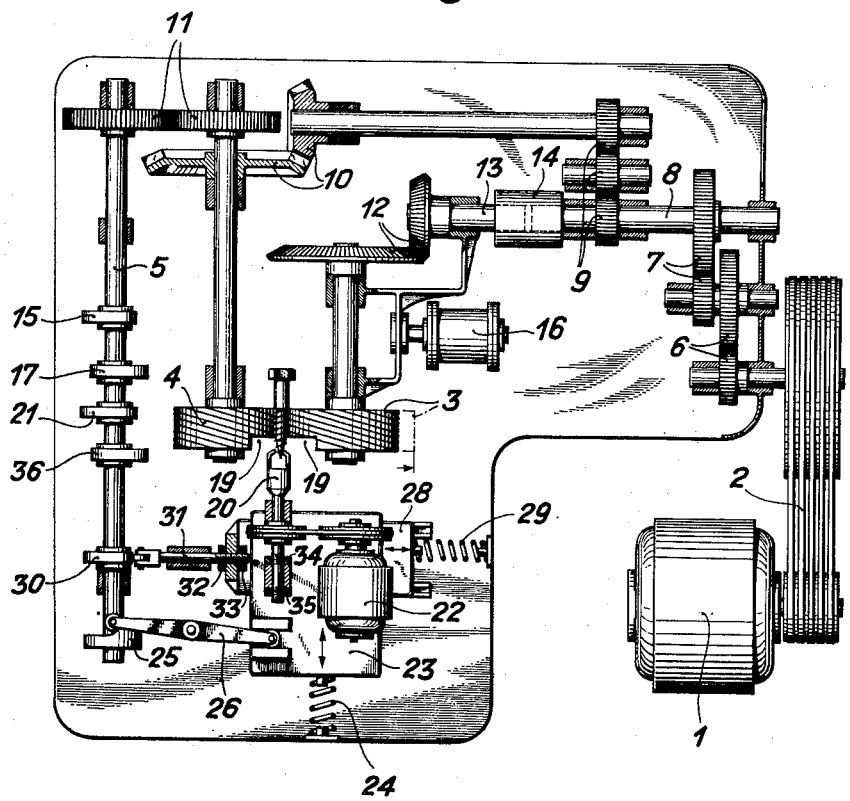
FIG. 1 is a plan view of the installation with certain parts in cross-sections.

The apparatus is driven from a motor 1, driving through a belt drive 2 the threaded rollers 3, 4 and the control shaft 5. To this end, there are provided intermediate gears 6, 7, from a driven shaft 8 of which the various drives are directed through spur gears 9 and through the bevel gears 10 for the thread roller 4, and through the pair of spur gears 11 as the drive for the control shaft 5. The drive for the thread roller 3 is effected through a bevel gear 12, the drive shaft 13 of which is longitudinally displaceably located in a coupling 14 into which engages from the other side the end of the take-off shaft 8.

The coupling 14 has the object to allow the thread roller 3 with its drive gears, located on a slide or the like, to be moved towards or from the counter roller 4 in the rhythm of the working cycle of the machine, controlled by means of a cam 15 on the control shaft 5, and actuated by hydraulic means.

The operation of the installation is as follows:

The wood screw blank shown in FIG. 5 is placed with the open thread roller, that is, with the returned roller 3, by means of a pair of pliers (not shown) controlled by a cam 17, between the rollers 3, 4 on to a guide 18. The threaded rollers have a width which is at least equal to the cylindrical threaded length of the wood screws to be made, but they have, on their ends facing the end of the shank recessed at 19 with such an arcuate length, width, and depth, that with every revolution of the roller the space about the shank end of the screw to be manufactured is opened for a sufficient time to allow a threading tool 20 to be inserted to the point in an axial or combined axial and radial direction, so that the point may be threaded.

For rolling the cylindrical portion of the shank, the thread roller 3 is moved toward the counter roller 4, or to the blank in the rhythm of the working cycle of the machine, and during a partial revolution of the rollers 3, 4, revolving in the same direction, the cylindrical portion of the screw is rolled. During the time (see FIGS. 2 and 3), during which the space about the point of the shaft of the partly threaded blank is accessible by means of the recesses 19 of both thread rollers, a thread cutting tool 20 is axially applied, whereby the point of the screw may be cut, and then the thread roller 3 is again applied; in this manner, a finished wood screw is produced with every revolution of the thread rollers. After the retraction of the thread roller 3, the screw may, for example, be gripped by a pair of pliers, controlled by a cam 21 and deposited somewhere outside the machine. The supply and delivery of blanks and of the finished wood screws may, of course, also be effected by other means.

The threading tool 20 is driven by a motor 22, and the tool unit is located on a longitudinal slide 23. The slide 23 is guided in suitable guides, and its longitudinal movements are controlled by a spring 24, a cam 25 and a lever 26. If a threading tool of this kind is used with a carbide-tipped internal cutting head 27, the lateral movement required for the application of the tool is effected by a cross-slide 28, carrying out its rhythmical movement by means of a spring 29, and a cam 30 by a push-rod 31. By suitably designing the cams 25, 30, any desired conical arcuate or curved shape of the threaded point of the screw may be manufactured.

The cutting depth over the point may be adjusted by means of adjusting nuts 32, 33. By means of adjusting nuts 34, 35, the cutting tool 20 may be so adjusted axially that a smooth transition between the point and the cylindrical shank portion is obtained. After termination of the cutting, the cutting tool is retracted by means of the cross-slide 28 in the lateral direction and returned by means of the longitudinal slide of the cam controls. This operation is repeated for every blank.

Since the rolling speeds may be rather high, whilst the cutting speeds of the tool 20 are limited, the motorized drive 1 is conveniently so designed that the driven speed of the thread rollers 3, 4 during the rolling is higher than during the cutting of the screw points. To this end, a cam 36 on the control shaft 5 is utilized for controlling the speed.

FIG. 4 shows a threading tool 37, with externally arranged, hard-metal-tipped cutters.

What I claim is:

1. An apparatus for producing wood screws from preformed blanks with a reduced diameter of the threaded shank section comprising two thread rollers having a width at least equal to the length of the threaded shank portion of the screw, means to rotate the rollers in the same direction of rotation to roll threads into the threaded shank section, one of the thread rollers being stationary, means to move the other thread roller away from and toward the first-mentioned thread roller, each thread roller having an arcuate recess in the side thereof extending for a segmental circumferential distance in each roller to expose a short end portion of the screw to be contacted by a tool for cutting a screw point on the screw, and means for axially and radially controlling the tool.

2. An apparatus according to claim 1, in which the rotating speed of the thread rollers exceed the speed of the rollers during the cutting of the screw point.

References Cited by the Examiner

UNITED STATES PATENTS 2,727,255   12/55   Fray ------------------ 10—4

FOREIGN PATENTS 668,565   3/52   Great Britain.

ANDREW R. JUHASZ, *Primary Examiner.*